(12) United States Patent
Hari et al.

(10) Patent No.: US 6,931,642 B1
(45) Date of Patent: *Aug. 16, 2005

(54) DATA TYPE MAPPING FOR EXTERNAL CALLOUTS

(75) Inventors: Radhakrishna Hari, Belmont, CA (US); David Unietis, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 10/353,364

(22) Filed: Jan. 28, 2003

Related U.S. Application Data

(62) Division of application No. 08/960,556, filed on Oct. 31, 1997, now Pat. No. 6,574,673.

(51) Int. Cl.⁷ .............................................. G06F 9/54
(52) U.S. Cl. .............................. 719/310; 707/1; 707/10
(58) Field of Search .................. 707/1–10, 100–104.1, 707/200–206; 719/310–320, 328

(56) References Cited

U.S. PATENT DOCUMENTS

| | | | | |
|---|---|---|---|---|
| 4,930,071 | A * | 5/1990 | Tou et al. ........................ | 707/4 |
| 5,414,812 | A * | 5/1995 | Filip et al. .............. | 707/103 R |
| 5,546,584 | A * | 8/1996 | Lundin et al. .............. | 719/315 |
| 5,761,656 | A * | 6/1998 | Ben-Shachar .................. | 707/4 |
| 5,848,273 | A * | 12/1998 | Fontana et al. ............. | 717/108 |
| 6,226,649 | B1 * | 5/2001 | Bodamer et al. ........ | 707/104.1 |

OTHER PUBLICATIONS

The Common Object Request Broker: Architecture and Specification, pp. 11-1 through 11-7, Jul. 1995.
N/a "COM/CORBA Interworking RFP Part A," OMG TC Document 95.8.19, pp. 17-40, Aug. 1995.
Yellin, et al., "Interfaces, Protocols, and the Semi-Automatic Construction of Software Adaptors," ACM, pp. 176-190, Oct. 1994.
Steven Bobrowski, "Oracle7 Server Concepts Manual", Dec. 1992, pp. 11-1 thru 11-9.

* cited by examiner

*Primary Examiner*—St. John Courtenay, III
(74) *Attorney, Agent, or Firm*—Marcel K. Bingham; Hickman Palermo Truong & Becker LLP

(57) ABSTRACT

A method and apparatus for communicating between a called routine written in a first programming language and calling routine written in a second programming language is described. User input specifies an interface of a proxy routine and the interface parameters of the interface. Metadata that is generated establishes a mapping of interface parameters to the routine parameters of the called routine. At least one interface parameter is of a data type not supported in the first programming language. The user input may specify that a first attribute of a particular interface parameter is associated with a first routine parameter of the called routine, and a second attribute of the particular interface parameter is associated with a second routine parameter of the called routine. The metadata maps the first attribute to the first routine parameter, and the second attribute to the second routine parameter.

10 Claims, 8 Drawing Sheets proxy routine interface 410
　　　　　　　　　412
foo(nat_x IN OUT BINARY_INTEGER, nat_y IN OUT VARCHAR(30))

parameters clause 420
　　　　421　　423　　　　　　　　　　425　　427
PARAMETERS(nat_x, nat_x NULLFLAG, nat_y LENGTH, nat_y)

external routine prototype 430
　　　431　　　　　　　　433　　　　　　　　　435　　　　　　　　　437
void c_foo(int ext_x, short ext_x_null_flag, short * ext_ylength, char * ext_y)
　　464

FIG. 4A

```
CREATE PROCEDURE
    foo(
412 ──      nat_x IN OUT BINARY_INTEGER,
414 ──      nat_y IN OUT VARCHAR(30)),
    AS EXTERNAL
        LIBRARY doe     ── 466
        NAME "c_foo"
        LANGUAGE C      ── 468
        CALLING STANDARD C
        PARAMETERS(
            421 ─ nat_x,
            423 ─ nat_x   NULLFLAG,
            425 ─ nat_y   LENGTH,
            427 ─ nat_y)
```

- Interface Specification Statement 460
- proxy routine interface 410
- parameters clause 420
- external clause 462

FIG. 4B

DATA TYPE MAPPING FOR EXTERNAL CALLOUTS

RELATED APPLICATION

The application is a divisional application of U.S. patent application Ser. No. 08/960,556, entitled *Data Type Mapping for External Callouts*, filed on Oct. 31, 1997, now U.S. Pat. No. 6,574,673 by Radhakrishna Hari and David Unietis, the contents of which are hereby incorporated herein by reference.

FIELD OF THE INVENTION

The present invention relates to the communication between routines on a computer system, and in particular, to the communication between one routine written in a first computer language and another routine written in a second computer language.

BACKGROUND OF THE INVENTION

Programs written in a first computer language sometimes call procedures written in a second computer language. A call from a program written in a first computer language to a routine written in a second computer language is referred to as an external callout. The program written in the second computer language is referred to as an external routine. Typically, the first and second computer languages support equivalent data types.

External callouts from routines written in a first computer language to routines written in a second computer language are more problematic when the second computer language does not support data types equivalent to one or more data types of the first computer language. For example, in PL/SQL™, a procedural database language available from Oracle corporation, a BINARY_INTEGER variable can specify any integer value but can also be null. Thus, each such variable is represented by a data structure that shares an integer value and a null flag. The corresponding C integer types (e.g. long, short) cannot represent a null value, and therefore do not have a null flag. Similarly, a PL/SQL™ variable of type VARCHAR2 has an associated LENGTH and MAXIMUM LENGTH, whereas the corresponding C string data type does not.

If it were desired to provide an external call to a C procedure from a PL/SQL routine, in order to communicate attribute information associated with PL/SQL™ variables to the C procedure, the parameter list of the C procedure could be designed with one or more additional ("attribute") parameters for storing the attribute information. These attribute parameters would have to be appropriately set before each call to the C procedure and examined upon return from the C procedure call. For example, consider an external C routine that performs an operation based upon input data represented by a PL/SQL™ variable of the BINARY_INTEGER data type, and that can modify the received value (including setting to null), and that has the following prototype:

foo(x long, x_null_flag short)

where x is a "long" integer value in C and x_null_flag is a "short" integer value in C that serves as a flag to indicate whether the input value x is supposed to be null. No input value supplied for x can be used to indicate null because all possible values of x represent valid integers.

Each call to foo from the PL/SQL program must do the following:
1. pass in a value for the x_null_flag parameter to indicate to the C procedure whether or not the PL/SQL integer variable passed in for the x parameter is null (e.g. x_null_flag=1 indicates null, x_null_flag=0 indicates not null);
2. upon return from the call, checking the value returned for the x_null_flag parameter, and if the value is −1, setting the PL/SQL integer variable passed in for the x parameter to null.

One possible approach for passing the required attribute information between a PL/SQL program and C routine is the "hard-coded" approach. In the hard-coded approach, the PL/SQL programmer provides code that explicitly sets the appropriate attribute parameters before each call to an external procedure, and examines the attribute parameters after each call.

The hard-coded approach is tedious and error-prone. For example, before each call to the procedure foo defined above, the PL/SQL programmer provides the code needed to perform some testing and setting of parameter variables. The following (where X1 and X2 are PL/SQL integers passed in as first and second parameters on the call to foo):

IF (X1 IS NULL) THEN
   X2:=−1
ELSE
   X2=0;
END IF;

In addition, upon return from each call to the procedure foo the PL/SQL programmer needs to perform some testing like the following:

IF (X2=−1) THEN
   X1:=NULL;
END IF;

Even if the problems of programmer tedium and error were tolerable, the above hard-coded approach might not provide a general solution, given that some types of attribute information might not be accessible to the PL/SQL™ programmer. For example, there is currently no means for the PL/SQL™ programmer to determine the MAXLEN associated with a PL/SQL™ variable. For these types of attributes, it is not possible for the programmer to determine what attribute values to send to the external routine.

Finally, given that PL/SQL™ is an interpretive language, the hard-coded approach involves increasing the amount of code that must be interpreted at runtime, which in turn, adversely impacts performance.

Based on the foregoing, it is clearly desirable to provide a method which reduces the tedium and error-proneness associated with programmer supplied code that explicitly sets and tests attribute parameter values before and after, respectively, each external callout. It is further desirable to provide a method of communicating to an external routine attribute information not available to the programmer. Finally, it is desirable to provide a method that reduces the adverse impact upon performance associated with the hard-coded approach and resulting from an increased amount of code to be interpreted at runtime.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A depicts an association between an exemplary proxy routine interface, an exemplary parameters clause, and an exemplary prototype of an external routine used to illustrate an embodiment of the invention;

FIG. 4B shows an exemplary interface specification statement;

DETAILED DESCRIPTION OF THE PREFERRED EMBODIMENT

A method and apparatus for communicating between a called routine written in a first programming language and calling routine written in a second programming language is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
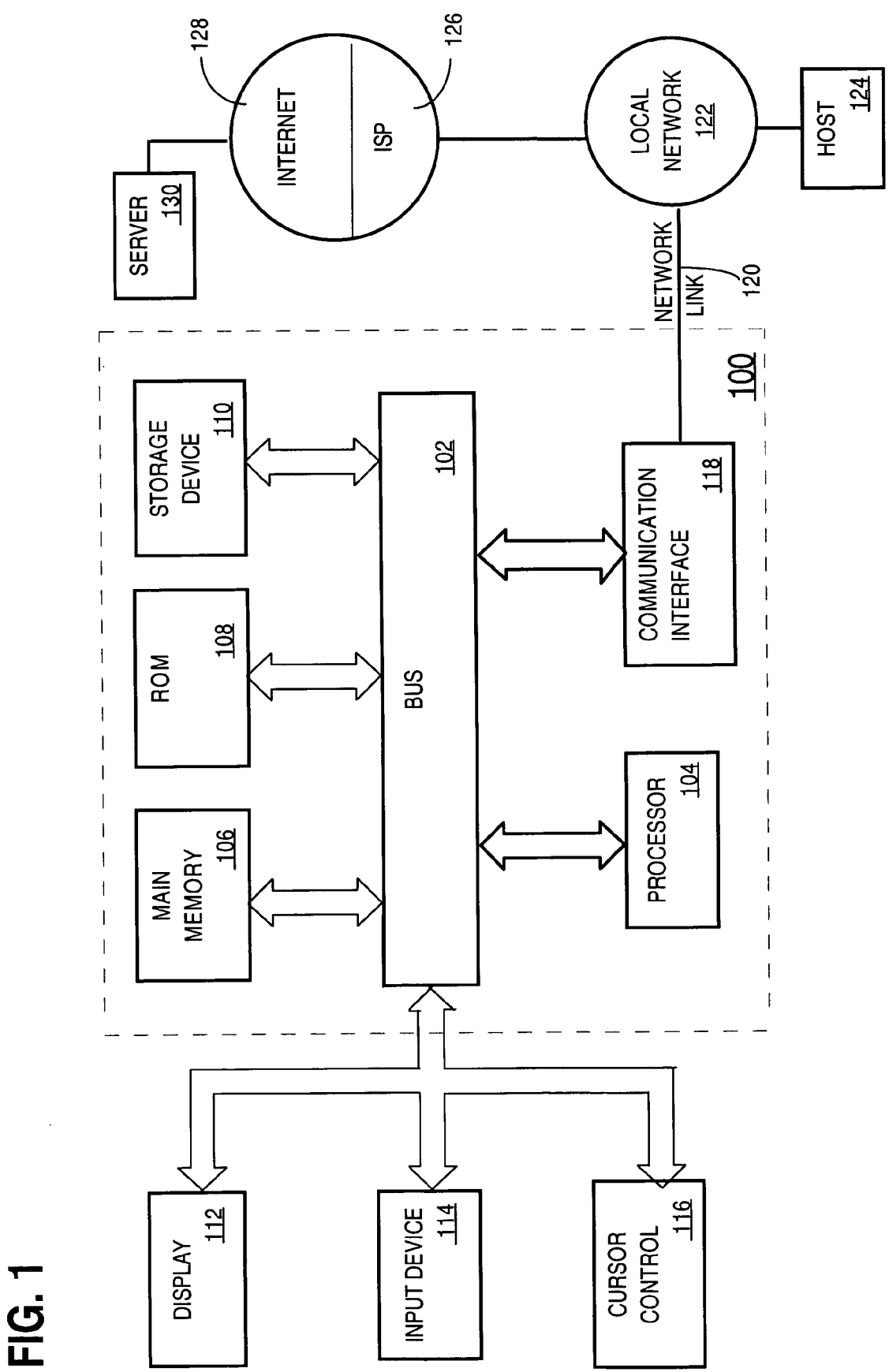
FIG. 1 is a block diagram of a computer system on which the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for communicating between a called routine written in a first programming language and calling routine written in a second programming language. According to one embodiment of the invention, the communication between a called routine written in a first programming language and calling routine written in a second programming language is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for communication between a called routine written in a first programming language and calling routine written in a second programming language as described herein.

The received code may be executed by processor 104 as it is received, and/or stored in storage device 110, or other non-volatile storage for later execution. In this manner, computer system 100 may obtain application code in the form of a carrier wave.

Functional Overview

Figure 2:
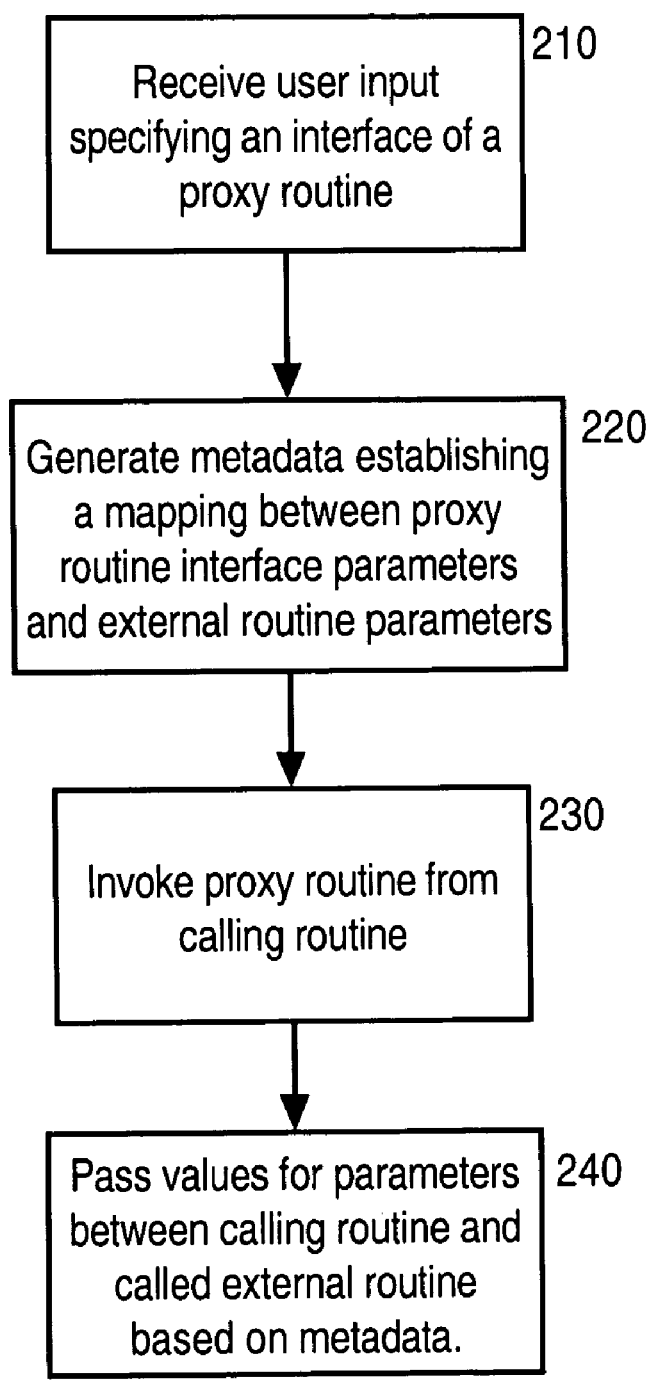
FIG. 2 is a flow chart showing an overview of steps performed for providing communication between a native routine and an external routine.

FIG. 2 is a flow chart showing an overview of steps of the present invention. In general, the present invention allows routines in a first programming language to make calls to routines in a second programming language by calling the routines using the same protocols and parameter types as are used to call routines in the first programming language. This is accomplished by establishing "proxy routines," in the first language for the routines in the second language. Calls are made to the proxy routines, and the values passed to the proxy routines are automatically re-ordered, split up or merged as necessary to make a call to the actual routines in the second programming language. Inverse operations are performed on data received back from the called routines so that the calling routines receive the results in the expected order and format. Specifically, at step 210, user input is received. The user input specifies an interface of a proxy routine, including the parameters of the proxy routine ("proxy routine interface parameters"). The proxy routine parameters are of types supported in the first programming language.

At step 220, metadata is generated and stored. The metadata establishes a mapping between the interface parameters of a proxy routine and the parameters of the external routine invoked in response to invoking its respective proxy routine. The proxy routine is invoked by a calling routine at step 230.

At step 240, values for parameters are passed from the calling routine to the external routine, and, upon return from the called external routine, from the external routine to the calling routine. During step 240, the values for the parameters are merged, split and/or reordered based on the metadata.

Exemplary Code Executor/Manager

Figure 3:
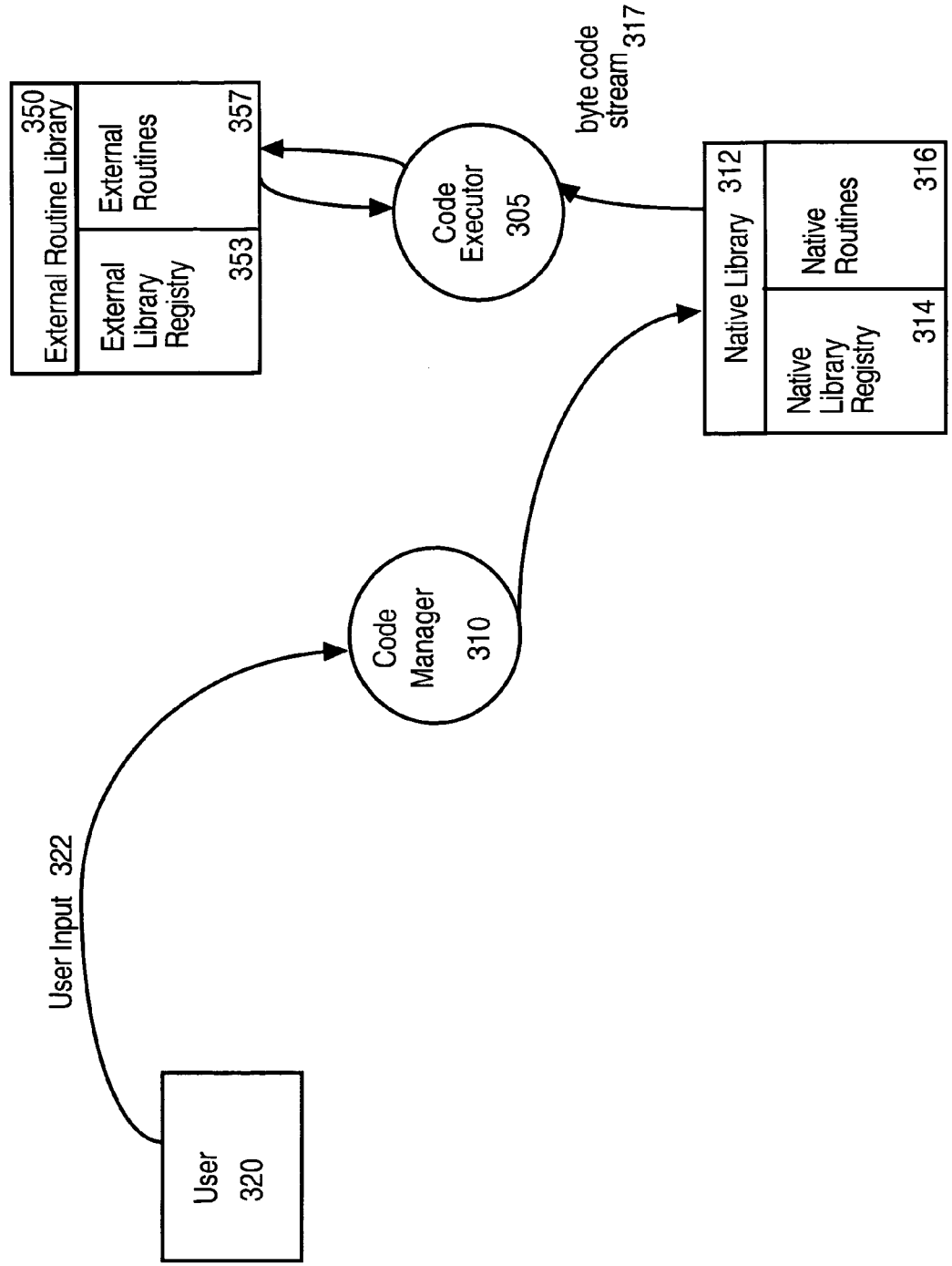
FIG. 3 is a block diagram of a code executor, code manager, and native and external routine libraries with which an embodiment of the invention may be implemented.

Referring to FIG. 3, code executor 305 executes byte code which code executor 305 receives from byte code stream 317. Byte code is generated by code manager 310 in response to receiving user input 322 from user 320. User input may be in the form of, for example, statements read from a source file into which user 320 has entered data, or statements received from a GUI oriented interface, in response to user interaction with the interface.

User input 322 may specify routines. The routines may be functions, (routines that may be included in expressions and which return a value when referred to in an expression) or procedures, (routines that are called and are not included in expressions, and which do not return a value except for via parameters).

In response to receiving user input specifying a routine, code manager 310 generates and stores in native library 312 metadata and byte code associated with the routines. Routines that are part of the native library 312 are referred to as native routines 316. Native library registry 314 contains metadata describing native routines 316. Byte code representing instructions for native routines 316 may also serve as a source of byte code for byte code stream 317.

Byte code contains instructions which code executor 305 executes. Byte code also contains references to metadata in native library registry 314. The metadata in native library registry 314 is examined by code executor 305 to determine the manner in which to respond to instructions code executor 305 encounters.

For example, byte code for one native routine may contain instructions to invoke another native routine. These instructions are associated with static function descriptors in control data referred to by references in byte code stream 317. A static function descriptor is a set of data structures which contain information about a routine call, such as a return data type of a routine that is a function, and/or the data types of the routine's parameters.

One example of a code executor is a PL/SQL™ interpretive engine. Byte code executed the PL/SQL™ interpretive engine is compiled by a PL/SQL™ manager based on user input written in the PL/SQL™ computer language.

External Library

External Routine Library 350 comprises a set of external routines 357, including functions, which may be invoked by code executor 305. External library registry 353 contains data describing each external routine callable by code executor 305. The external library registry 353 contains data such as data identifying the routines in the library (e.g. external routine names), and metadata such as the data type of the return value of a routine that is a function, and the data types of the parameters of the external routine. A language in which an external routine is written is referred to as an external language. A parameter of an external routine is referred to as a external parameter. For the purposes of explanation only one external routine library 350 is shown. However, code executor 305 may call routines from more than one external routine library.

External routine library 350 may be, for example, a DLL (dynamic linked library). A dynamic linked library is file in which the operating system of computer system 100 stores external routines. For the purposes of explanation, it shall be assumed that external routines 357 are written in C, and include an external routine named "foo". For example, consider the routine c_foo, whose prototype, external routine prototype 430, is shown in FIG. 4A. A prototype is a declaration of a routine's parameter data types, and return data type if the routine is a function. As shown in FIG. 4A, c_foo has the void return type (i.e. void type). The four parameters of c_foo and their data types are ext_x as an int (integer), ext_x_null_flag as a short * (pointer to short integer), ext_ylength as a short, and ext_y as a char * (pointer to a character). The external library registry 353 (FIG. 3) would contain data identifying the name of function c_foo, and metadata describing the return data type of the return value and the parameters.

Data Type Attributes

A data type is a description of a structure that a data item may possess. Data types vary in the complexity of their structures. A complex data type may include multiple "attributes" each of which may itself belong to a data type. An attribute represents one property of a data type. For example, the BINARY_INTEGER data type, provided in PL/SQL™ has one attribute that indicates whether a record of data belonging to the BINARY INTEGER data type, is null and another attribute that represents an integer value.

Each data type has base attribute. The base attribute of a data type typically represents the primary property of the data type. For example, the base attribute of the BINARY_INTEGER data type in PL/SQL™ is the attribute representing the integer value. The base attribute of the data type VARCHAR2 is the attribute representing the string of characters.

The C data types referred to herein typically only have one attribute. For example, the data type "int" has one attribute representing an integer value. The data type char * has one attribute representing a pointer to data represented by a variable of the char data type.

Data types of one language may not be supported by another language. For example, the BINARY_INTEGER data type of PL/SQL™ is not supported by any data type of C. Specifically, while C has a data type having an integer attribute (e.g. int, short), C has no data type that, in addition to an integer attribute, has a attribute representing the nullity of a data type. An attribute representing the nullity of data type is herein referred to as a null flag attribute. In general, a PL/SQL data type having more than one attribute is not supported by any data type available in C.

To fully represent a PL/SQL™ data type in C, two or more parameters of a C data type may required to represent a parameter belonging to a PL/SQL™ data type. For example, the external parameter 431 (ext_x), an int, may be used to represent the integer attribute of a PL/SQL BINARY_INTEGER parameter, and the external parameter 433 (ext_x_null_flag), a short "integer, may be used to represent the null flag attribute.

Defining Interfaces to External Routines

Code manager 310 defines an interface to an external routine in response to receiving user input that includes a interface specification statement. For example, in PL/SQL™, an interface specification statement may include (1) data that specifies the interface of a PL/SQL proxy routine and (2) an "external" clause that specifies information about the external routine.

According to one embodiment, the format of the external clause includes:
EXTERNAL LIBRARY library name
  [NAME external routine name]
  [LANGUAGE language name]
  [CALLING STANDARD {C|PASCAL}]
  [PARAMETER (attribute identifier [, attribute identifier] . . . ]
where attribute identifier stands for
  {interface parameter identifier|RETURN} [property] [external type]}
and property stands for
  {NULLFLAG|LENGTH|MAXLEN|CHARSETID| CHARSETFORM}

An interface specification statement specifies to code manager 310 how to call the external routine and pass data to it, and where to find the external routine. For example, consider exemplary interface specification statement 460 shown in FIG. 4B. The interface specification statement 460 includes proxy routine interface 410 and external clause 462. Proxy routine interface 410 includes two proxy routine interface parameters, proxy routine interface parameter 412 (nat_x) and proxy routine interface parameter 414 (nat_y). The data type of proxy routine interface parameter 412, nat_x, is BINARY_INTEGER, and the data type of proxy routine interface parameter 414, nat_y, is VARCHAR2(30), i.e. a variable length string with a maximum length of 30.

External clause 462 (FIG. 4B), specifies that the name 464 of the external routine is c_foo. The external clause also specifies the library 466 which contains the specified external routine (library doe), the language 468 in which the specified external routine is written, and that the external routine is called using the C calling standard.

Specifying the Mapping between Parameters

To specify a mapping between interface parameters of a proxy routine and the parameters of the specified external routine, the external clause may contain a parameters clause. For example, the exemplary parameters clause 420 is contained in the external clause 462 of FIG. 4B.

FIG. 4A depicts the mapping specified by parameters clause 420. Parameters clause 420 includes a list of four attribute identifiers, attribute identifier 421 ("nat_x"), attribute identifier 423 ("nat_x NULLFLAG"), attribute identifier 425 ("nat_y LENGTH"), and attribute identifier 427 ("nat_y").

Each attribute identifier contains a proxy routine interface parameter identifier which identifies the particular proxy routine interface parameter to which an attribute identifier is associated. Attribute identifier 421 ("nat_x") and attribute identifier 423 ("nat_x NULLFLAG") contain the parameter identifier "nat_x", and thus attribute identifier 421 ("nat_x") and attribute identifier 423 ("nat_x NULLFLAG") are associated with proxy routine interface parameter 412 (nat_x).

In addition to the proxy routine interface parameter identifier, an attribute identifier may contain additional data that indicates the particular attribute of the proxy routine interface parameter with which an attribute identifier is associated. For example, an attribute identifier may contain a keyword, herein referred to as a property keyword, such as "NULLFLAG". The property keyword "NULLFLAG" of the attribute identifier 423 (nat_x NULLFLAG) indicates the null flag attribute of proxy routine interface parameter 412 (nat_x), and thus attribute identifier 423 (nat_x NULLFLAG) is associated with the null flag attribute of proxy routine interface parameter 412.

Other property keywords involve the string related data types of PL/SQL™, such as VARCHAR2. These keywords include length(i.e. number of characters), maxlen (i.e. maximum number of characters), and charsetid and charsetform (i.e. the particular character set contained by a string related variable).

The absence of a property keyword implicitly indicates the base attribute of the proxy routine interface parameter. For example, the attribute identifier 421 (nat_x) indicates the base attribute of the proxy routine interface parameter 412 (nat_x), which is an integer value.

Attribute identifier 425 ("nat_y length") and attribute identifier 427 ("nat_y") are each associated with proxy routine interface parameter 414 (nat_y). Attribute identifier 425 ("nat_y length") specifies the length attribute of proxy routine interface parameter 414 ("nat_y"). Attribute identifier 427 ("nat_y") specifies the base attribute of proxy routine interface parameter 414 ("nat_y").

The attribute identifier may contain data indicating the external data type of the external parameter with which an attribute identifier is associated. For example, an attribute identifier may contain a keyword (e.g. int, short, long) indicating the external data type of the associated external parameter. Such a keyword is referred to as an external type keyword.

For example, consider the following parameter clause:
parameter(doe NULLFLAG short)

The parameter clause includes the proxy routine interface parameter identifier "doe", followed by property keyword "NULLFLAG", followed by the external type keyword "short", which is an external type keyword associated with an external data type of C.

Each attribute identifier in a parameters clause is positionally associated with an external parameter of the external routine specified by the external clause. For example, the second attribute identifier of parameter clause 420, attribute identifier 423 (nat_x NULLFLAG), is positionally associated with second external parameter of c_foo shown in external routine prototype 430, external parameter 433 (ext_x_null_flag).

An external parameter is considered mapped to the interface attribute specified by the attribute identifier associated with the external parameter. For example, external parameter 435 is considered mapped to the length attribute of proxy routine interface parameter 414 (nat_y) because the name of attribute identifier 425 specifies the length attribute of proxy routine interface parameter 414, and attribute identifier 425 is positionally associated with the external parameter 435 ("ext_y_length").

Generating Descriptors

In response to receiving user input in the form of an interface specification statement, the code manager 310 generates metadata about the interface. According to one embodiment, the metadata includes static descriptors and foreign descriptors. In general, static descriptors and foreign descriptors together describe the manner in which data is passed between a native routine and an external routine, and establish a mapping between attributes of the proxy routine interface parameters and the external parameters.

Figure 5:
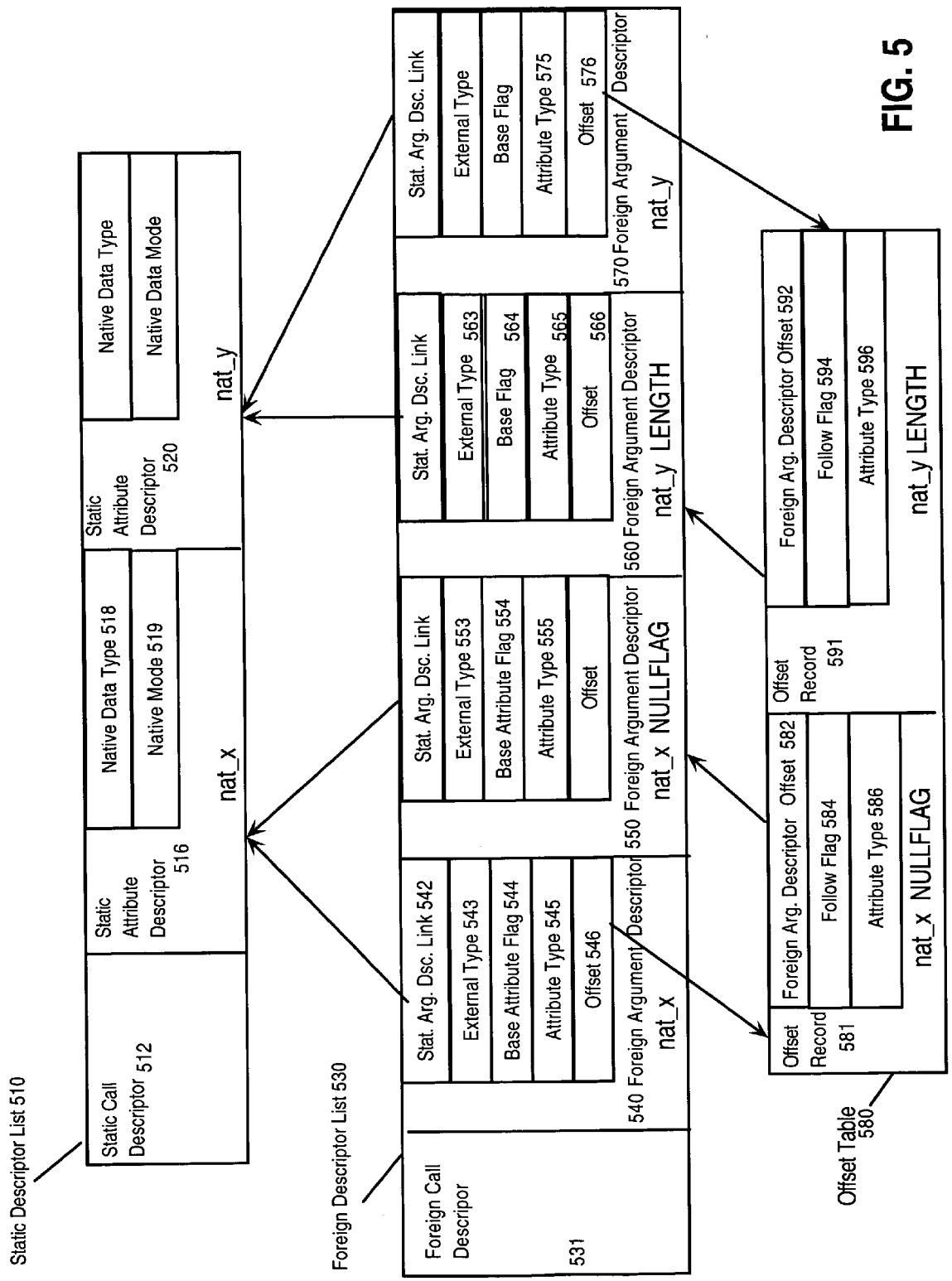
FIG. 5 shows an exemplary static call descriptor, exemplary static argument descriptors, an exemplary foreign call descriptor, and exemplary foreign argument descriptors.

Static descriptors are data structures containing metadata describing calls to proxy routines. FIG. 5 depicts static descriptor list 510, which is a list of static descriptor records. The first record in a static descriptor list 510 is a static call descriptor 512. Following a static call descriptor is an ordered list of static argument descriptors. For example, static call descriptor 512 is followed by static argument descriptors 516 and 520. The static descriptors in static descriptor list 510 describe a call to proxy routine foo. The static call descriptor 512 contains general information about the routine it describes, such as whether the routine is a function or a procedure.

Each of static argument descriptors 516 and 520 contain information about the specific proxy routine interface parameter associated with the static argument descriptor. A static argument descriptor is associated with the proxy routine interface parameter having the same ordered position in the list of parameters of a proxy routine interface as the static argument descriptor has among the static argument descriptors in an static descriptor list. For example, static argument descriptor 516 (FIG. 5) is associated with nat_x in proxy routine interface 410 (FIG. 4A). Static argument descriptor 516 (FIG. 5) contains two fields: native data type 518 and native mode 519. Native data type 518 contains data denoting the data type of the proxy routine interface parameter associated with the static argument descriptor 516.

Native mode 519 contains data denoting the mode in which data is passed to the proxy routine interface parameter associated with static argument descriptor 516. For example, in PL/SQL™, parameters may be passed in three modes: IN, OUT and, IN OUT. Under IN mode, memory allocated to a parameter can only be read. In OUT, memory allocated to a parameter can only be written to. Under IN OUT mode, memory allocated to a parameter can be read from and written to.

Foreign Descriptors

Foreign descriptors are used to describe external callouts to the specified external routine, and are generated in response to receiving an interface specification statement. When the interface specification statement contains a parameters clause, the foreign descriptors are generated in accordance to the mapping specified by the parameters clause.

FIG. 5 depicts the foreign descriptors generated in response to receiving the exemplary interface specification statement 460 (FIG. 4B). Foreign descriptor list 530 includes a foreign call descriptor 531, and foreign argument descriptors 540, 550, 560, and 570.

The data contained in foreign call descriptor 531 includes data pertinent to performing an external callout to the external routine specified by the interface statement. For example, the data included in a foreign call descriptor includes data indicating the language of the external routine, the calling standard (e.g. C or Pascal), and whether the external routine executes in a separate address space. Also included is the number of the foreign argument descriptors in foreign descriptor list 530.

One foreign argument descriptor is generated for each attribute identifier. Thus, each foreign argument descriptor corresponds to one attribute of a proxy routine interface parameter, and one external parameter. The sequential order of the foreign argument descriptors in foreign descriptor list 530 corresponds to the sequential order of external parameters in the specified external routine. For example, foreign argument descriptor 540 (FIG. 5), the first foreign argument descriptor in foreign descriptor list 530, is associated with external parameter 431 (ext_x in FIG. 4A), the first external parameter represented by external routine prototype 430.

Each foreign argument descriptor includes five fields: a static argument descriptor link, an external type, a base flag, an attribute type, and an offset. For example, foreign argument descriptor 540 includes static argument descriptor link 542, external type 543, base flag 544, attribute type 545, and offset 546.

A static argument descriptor link links the foreign argument descriptor containing the static argument descriptor link to a static argument descriptor, which is herein referred to as the linked static argument descriptor. In one embodiment of the invention, the link contains data representing the linked static argument descriptor's sequential position among the other static argument descriptors in the static descriptor list 510. Assume for example, that foreign argument descriptor 540 is linked to static argument descriptor 516. The static argument descriptor link 542 contains the number 0, representing the first sequential position among the foreign argument descriptors in static descriptor list 510.

While one mechanism has been described for linking a foreign argument descriptor to an static argument descriptor, other alternatives are possible. Therefore, it is understood that the present invention in not limited to any particular mechanism for linking a foreign argument descriptor to an static argument descriptor.

A foreign argument descriptor is said to be associated with the proxy routine interface parameter that is associated with the static argument descriptor linked to the foreign argument descriptor. For example, foreign argument descriptor 540 (FIG. 5) is linked to static argument descriptor 516, which is associated with a proxy routine interface parameter 412 (FIG. 4A). Foreign argument descriptor 540 is thus associated with proxy routine interface parameter 412.

External type 543 contains data representing the data type of the external parameter 431 that is associated with foreign argument descriptor 540. The value of an external type field is based on data in the corresponding attribute identifier that indicates the external data type of the associated external parameter. When the attribute identifier does not contain such data, the external type field is set to a value indicating a default external data type typically used to represent the attribute of the proxy routine interface parameter associated with the foreign argument descriptor. For example, an external parameter for a C function is used to represent the null flag attribute of a variable of the BINARY_INTEGER data type in PL/SQL. In the present example, external parameter 431 is an "int", so external type 543 contains data that indicates the "int" data type.

Base and Subordinate Foreign Argument Descriptors

The base foreign argument descriptor flag indicates whether the foreign argument descriptor that contains the flag is the base foreign argument descriptor of the corresponding proxy routine interface parameter. Only one base foreign argument descriptor is generated for each static argument descriptor (i.e., for each proxy routine interface parameter). Such a foreign argument descriptor is considered to be associated with the base attribute of the proxy routine interface parameter associated with the foreign argument descriptor.

When a foreign argument descriptor is not a base foreign argument descriptor, the foreign argument descriptor is associated with a non-base attribute (i.e. an attribute other than the base attribute) of its associated proxy routine interface parameter. A foreign argument descriptor that is not a base foreign argument descriptor is referred to as a subordinate foreign argument descriptor. A subordinate foreign argument descriptor is subordinate to a base foreign argument descriptor if the subordinate foreign argument descriptor is linked to the same static argument descriptor as the foreign argument descriptor. Thus, for a given proxy routine interface parameter, the associated base foreign argument descriptor is considered associated with the base attribute of the proxy routine interface parameter, and, the subordinate foreign argument descriptors subordinate to the base foreign argument descriptor are considered associated with the non-base attributes of the proxy routine interface parameter.

Referring to FIG. 5, for example, foreign argument descriptor 540 is a base foreign argument descriptor and foreign argument descriptor 550 is a subordinate foreign argument descriptor that is subordinate to foreign argument descriptor 540. Foreign argument descriptor 540 and foreign argument descriptor 550 are linked to static argument descriptor 516. Because proxy routine interface parameter 412 (nat_x) is associated with static argument descriptor 516, which is linked to base foreign argument descriptor 540 and subordinate foreign argument descriptor 550, proxy routine interface parameter 412 (nat_x) is associated with base foreign argument descriptor 540 and subordinate foreign argument descriptor 550. Base foreign argument descriptor 540 is associated with the base attribute of proxy routine interface parameter 412 (nat_x), and subordinate foreign argument descriptor 550 is associated with the non-base attribute (null flag) of proxy routine interface parameter 412 (nat_).

An attribute type denotes the non-base attribute of the proxy routine interface parameter associated with a subordinate foreign argument descriptor. For example, foreign argument descriptor 550 (FIG. 5) is associated with the null flag attribute of its associated proxy routine interface parameter 412 (nat_x). Thus, the attribute type 555 is set to denote that a foreign argument descriptor 550 is associated with the null flag attribute of proxy routine interface parameter 412 (nat_x).

The foreign argument descriptors and static argument descriptors together establish a mapping between the external parameters of the specified external routine and the proxy routine interface parameters. The external parameter associated with a foreign argument descriptor is considered mapped to the attribute, as denoted by the foreign argument descriptor's attribute type field, of the proxy routine interface parameter associated with the foreign argument descriptor. The proxy routine interface parameter associated with the foreign argument descriptor is the proxy routine interface parameter corresponding to the static argument descriptor linked to the foreign argument descriptor. For example in FIG. 4A, external parameter 433 ("ext_x_null_flag"), the second parameter of c_foo, is associated with foreign argument descriptor 550 (FIG. 5). Attribute type field 555 of foreign argument descriptor 550 denotes the null flag attribute. The foreign argument descriptor 550 is linked to static argument descriptor 516, the static argument descriptor associated with proxy routine interface parameter 412 (nat_x) in FIG. 4A. Thus, the null flag attribute of the proxy routine interface parameter 412 (nat_x) is mapped to the external parameter 433 (ext_x_null_flag).

It should be noted that when the proxy routine represents a function, its return value is treated as another parameter. The same applies to external routines that are functions. For example, assume that a proxy routine is a function with one proxy routine interface parameter. The static descriptor list includes a first static argument descriptor for the return value, and a second static argument descriptor for one proxy routine interface parameter. The foreign descriptor list may contain a first base foreign argument descriptor for the return value, and a second base foreign argument descriptor for the one proxy routine interface parameter. Both the first and second foreign argument descriptors may be linked to one or more subordinate foreign argument descriptors.

Offset Sequences and the Offset Table

A base foreign argument descriptor may be linked to a sequence of offset records (an "offset sequence") in offset table 580 (FIG. 5). The offset sequence contains an offset records for each foreign argument descriptor subordinate to the base foreign argument descriptor. Each offset record is uniquely associated with one subordinate foreign argument descriptor subordinate to the base foreign argument descriptor.

An offset field, such as offset 546, links a base foreign argument descriptor to an offset sequence. Offset 546 contains data based on the number records between the beginning of offset table 580 and the first record of the offset sequence linked to the base foreign argument descriptor. When, for a given base foreign argument descriptor there are no subordinate foreign argument descriptors, the offset of the base foreign argument descriptor is set to indicate that there is no sequence of records linked to the base foreign argument descriptor.

In one embodiment of the invention, the offset field for a given base foreign argument descriptor contains the number of bytes between the beginning of the offset table and the offset sequence linked to the base foreign argument descriptor. The number of bytes is based on the number of bytes in an offset record and the number of records between the beginning of the offset table and the offset sequence. For example, offset record 591 includes the offset sequence linked to base foreign argument descriptor 570. In one embodiment of the invention, every offset record contains four bytes. Offset 576 of foreign argument descriptor 570 contains the value four. Four is the number of bytes between offset record 591 and the beginning of the offset table 580.

A follows flag contains data indicating whether an offset record belonging to the same offset sequence follows. A foreign argument descriptor offset links an offset record to the offset record's respective subordinate foreign argument descriptor. In one embodiment of the invention, a foreign argument descriptor offset for a given foreign argument descriptor contains the number of bytes between the beginning of the associated foreign descriptor list and the foreign argument descriptor.

In this example, the offset sequence associated with base foreign argument descriptor 570 contains just one offset record, offset record 591. Thus, follows flag 594 is set to indicate no offset record follows. Foreign argument descriptor offset 592 contains the number of bytes between the beginning of foreign descriptor list 530 and foreign argument descriptor 560.

To further illustrate the use of the follows flag, another example is useful. If an offset sequence has three offset records, the follows flag for the first two is set to indicate an offset record follows, and the follows flag of the third offset record to indicates no offset record follows.

Default Mappings

An interface specification statement need not contain a parameters clause specifying a mapping. When an interface specification statement that does not contain a parameters clause is received, a default mapping can be established by generating a set of foreign argument descriptors according to a default set of rules.

For example, assume an interface specification statement for proxy routine moo(number_of_cows BINARY_INTEGER) is received without any parameters clause. The default set of rules may specify, for example, that only the base attribute of a proxy routine interface parameter is mapped, and, more specifically, that a BINARY_INTEGER proxy routine interface parameter is mapped to an external parameter belonging to the C data type int. Using these rules, the base attribute of number_of_cows is mapped to external parameter c_number_of_cows, a parameter of the C data type int.

As another example, a default rule may specify that the non-base attributes of a proxy routine interface parameter are mapped to external parameters that follow the particular external parameter that is mapped to the base attribute. For example, in the case of BINARY_INTEGER proxy routine interface parameters, (1) the base attribute could be mapped to a first external parameter of the C data type int, and (2) the null flag attribute could be mapped to a second external parameter of the C data type short that follows the first. Using the latter rule, (1) the base attribute of number_of_cows would be mapped to c_number_of_cows, a parameter of the C data type int, and (2) the non-base null flag attribute of number_of_cows would be mapped to c_number_of_cows_null_flag, a parameter of the C data type short.

The latter exemplary default rule is advantageous because the mapping generated conforms to the prototypes of many C functions in existing libraries, that were expressly written to receive data represented by the PL/SQL data type BINARY_INTEGER.

Translating Data during Uploading

Figure 6:
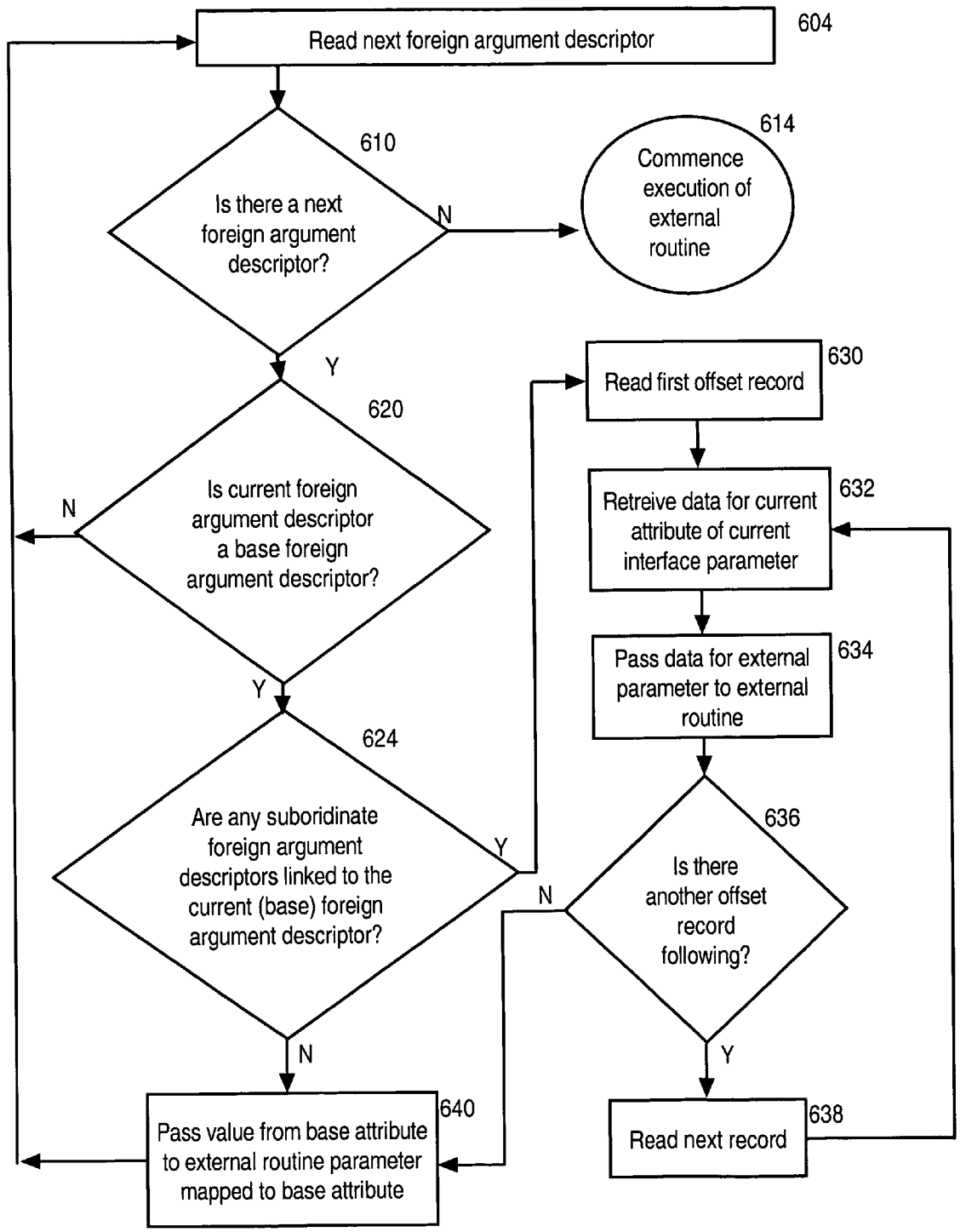
FIG. 6 shows the steps for translating data and passing values for parameters from a native routine to an external routine.

Uploading is the process of passing values for the interface parameters of a proxy routine to the parameters of the external routine. Uploading is performed in response to the invocation of a proxy routine. Passing values refers to transferring data in the memory allocated to the parameters of a proxy routine to the memory allocated to parameters of the external routine. FIG. 6 is a flowchart showing the steps performed to translate data during uploading. Translating data refers to transferring values stored in one or more data records storing values for variables of one or more data types of one language to one or more other data records used to store values for variables of one or more data types of another language.

The steps in FIG. 6 shall be explained with reference to static descriptor list 510 (FIG. 5), foreign descriptor list 530, and offset table 580, which correspond to proxy routine interface 410, and external routine prototype 430, and parameters clause 420. The steps are performed in response to a native routine invoking a proxy routine corresponding to proxy routine interface 410.

At step 604, the next foreign argument descriptor is read, beginning with the first foreign argument descriptor in foreign descriptor list 530. The next foreign argument descriptor that is read is referred to as the current foreign argument descriptor. The proxy routine interface parameter associated with the static argument descriptor referred to by the static argument descriptor link of the current foreign argument descriptor is referred to as the current proxy routine interface parameter. The native data type field and the native mode field are also read from the static argument descriptor linked to current foreign argument descriptor.

In this example, foreign argument descriptor 540, the first foreign argument descriptor in foreign descriptor list 530, is read, and thus becomes the current foreign argument descriptor. Static argument descriptor 516 is pointed to by static argument descriptor link 542 of foreign argument descriptor 540, and thus nat_x becomes the current proxy routine interface parameter. The native data type field 518 (BINARY_INTEGER) and native mode field 519 (IN OUT) of static argument descriptor 516 are then read.

At step 610, a determination is made of whether a next foreign argument descriptor was read. If a foreign argument descriptor was not read, then control passes to step 614, where execution of the call to the external routine is commenced. Otherwise, control passes to step 620. In this example, because a foreign argument descriptor 540 was read, control passes to step 620.

At step 620, a determination is made of whether the current foreign argument descriptor is a base foreign argument descriptor. This determination is made by examining the base flag of the current foreign argument descriptor. If the base attribute indicates that the current foreign argument descriptor is a base foreign argument descriptor, then control passes to step 624. Otherwise, control returns to step 604, where the next foreign argument descriptor is read. In this example, because the base flag 544 of the foreign argument descriptor 540, (the base flag of the current foreign argument descriptor), indicates that the foreign argument descriptor 540 is a base foreign argument descriptor, control passes to step 624.

At step 624, it is determined whether there are any subordinate foreign argument descriptors linked to the current (base) foreign argument descriptor. This determination is made by examining the offset field of the current foreign argument descriptor. If the offset field contains data indicating that the current foreign argument descriptor is linked to an offset sequence, then the current foreign argument descriptor is linked to at least one subordinate foreign argument descriptor. The offset sequence to which the current foreign argument descriptor is linked is referred to as the current offset sequence. Control then passes to step 630. Otherwise, control passes to step 640. In this example, the offset field contains the number zero, indicating that the foreign argument descriptor 540 (the current foreign argument descriptor) is linked to an offset sequence beginning zero bytes from the beginning of offset table 580. Control thus passes to step 630. At step 630, the first record of the offset sequence is read. The offset record which is read is referred to as the current offset record. In this example, offset record 581 is read.

As mentioned previously, an offset record is linked to a subordinate foreign argument descriptor, which is associated with an external parameter. The external parameter associated with the foreign argument descriptor linked to the current offset record is referred to as the current external parameter. The attribute of the current proxy routine interface parameter to which the external parameter is mapped is referred to as the current attribute. This latter proxy routine interface parameter is referred to as the current proxy routine interface parameter.

Step 632 through step 638 represent a loop where, for each attribute associated with the subordinate foreign argument descriptors, a value is passed to an external parameter of the external routine. At step 632, data is retrieved for the current attribute of the proxy routine interface parameter. First, the current attribute is determined by examining the attribute type field of the current offset record. Once the current attribute is determined, data from the data structure holding data for the current proxy routine interface parameter is examined to retrieve data for the current attribute.

In this example, attribute type 586, the attribute type field of the current offset record 581, is examined. Attribute type 586 is set to a value representing the null flag attribute. Data from the data structure holding data for the proxy routine interface parameter 412 (nat_x in FIG. 4A) is examined to retrieve data for the null flag attribute, the current attribute.

At step 634, data is passed for the current external parameter to the external routine. First, the external data type of the current external parameter (the "current external data type") is determined by examining the external type field of the foreign argument descriptor associated with the current external parameter. Then, if necessary, the data retrieved in step 634 (the data representing the current attribute) is converted to conform to the requirements of the current external data type.

Finally, the data is transferred to the memory location necessary to pass the data to the external routine as a parameter of the external data type. Techniques for transferring data to the external routine as a parameter of a given external data type depend on the calling standard and the operation system(s) running on computer system 100. Such techniques are well known and shall not be further described.

In this example, foreign argument descriptor link 582 (the foreign argument descriptor link of the current offset record) refers to foreign argument descriptor 550. The external type field of foreign argument descriptor 550 (external type 553) is examined. The external type is determined to be a short integer (a C data type). Assume the data retrieved in step 632 (the data representing the current attribute) requires no conversion to conform to the requirements of a short integer. Finally, the data is transferred to the memory location necessary to pass the data to the external routine c_foo as the external parameter 431 (ext_x_null_flag in FIG. 4A), a short integer.

In one embodiment of the invention, when the native mode represents a parameter through which data is only output (e.g. OUT mode in PL/SQL™), the step of examining the data structure holding data for the proxy routine interface parameter (step 632) is skipped. Instead of performing step 634, a default value is generated. For example, if the native mode were OUT for a PL/SQL parameter, and the current attribute is the attribute representing the null flag, a value of negative integer one would be passed to the external routine.

At step 636, a determination is made of whether another offset record, belonging to the offset sequence associated with the current foreign argument descriptor, follows the current offset record. The determination is made by examining the follow flag of the current offset record. If the follow flag is set to indicate another offset record follows, control flows to step 638.

At step 638, another member offset record of the current offset sequence is read. Then control returns to step 632. If on the other hand, the follow flag of the current offset record is set to indicate no offset record belonging to the same offset sequence follows, then control flows to step 640. In this example, the follow flag 584 is set to indicate that no offset record follows. Thus control flows to step 640.

At step 640, a value is passed for the base attribute of the current proxy routine interface parameter to the external parameter mapped to the attribute. The steps performed at step 640 are similar to those performed in step 632 and step 634. After step 640, control returns to step 604, where the next foreign argument descriptor is read. In this example, the base attribute of current proxy routine interface parameter, proxy routine interface parameter 412 (nat_x in FIG. 4A), is passed to the external parameter mapped to nat_x, external parameter 431 (ext_x in FIG. 4A). Control then returns to step 604.

Continuing with the current example, the next foreign argument descriptor is read, which is foreign argument descriptor 550. At step 610, the determination is that a next foreign argument descriptor was read, so control passes to step 620. At step 620, the determination made is that current foreign argument descriptor, foreign argument descriptor 550, is not a base foreign argument descriptor, so control passes to step 604.

At step 604, the foreign argument descriptor read is foreign argument descriptor 560. The steps proceed in the same manner described immediately above for foreign argument descriptor 550 because foreign argument descriptor 560 is not a base foreign argument descriptor.

Returning to step 604, the next foreign argument descriptor read is foreign argument descriptor 570. Foreign argument descriptor 570 becomes the current foreign argument descriptor. Because foreign argument descriptor 570 is a base foreign argument descriptor, the steps proceed for foreign argument descriptor 570 in manner similarly described for foreign argument descriptor 540. After the current attribute for length for the current proxy routine interface parameter, proxy routine interface parameter 414 (nat_y), is passed to the external routine c_foo, control eventually flows to step 640. At step 640, a pointer containing the string represented by the base attribute of proxy routine interface parameter 414 (nat_y) is passed to the external routine for the external parameter 437 (ext_y).

Control returns to step 604, where no next foreign argument descriptor is read, and then to step 610, where the determination made is there is no next foreign argument descriptor. At step 614, execution of the steps shown in FIG. 6 ceases. The external routine is called and its execution begins.

Translating Data during Downloading

Figure 7:
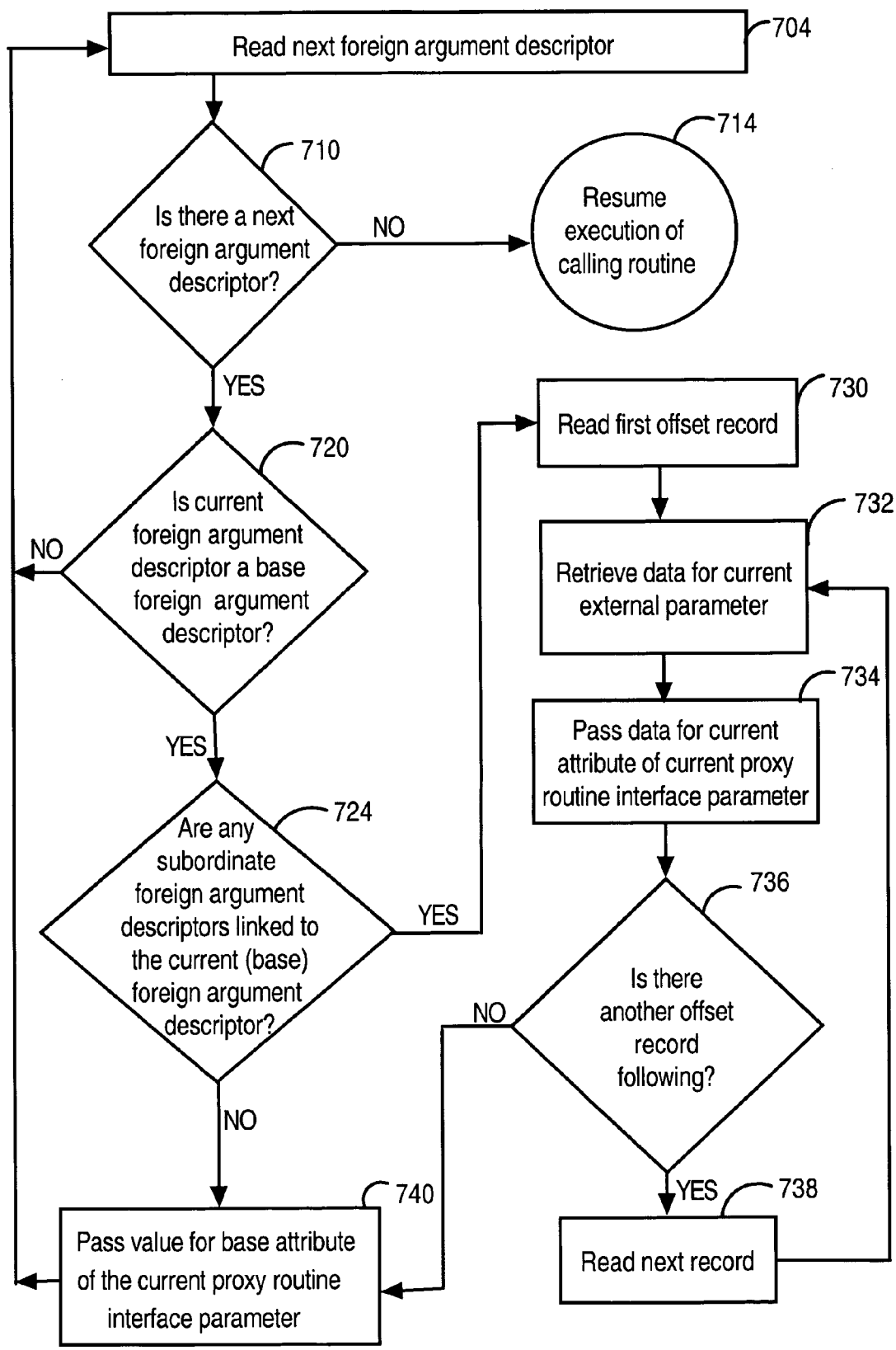
FIG. 7 shows the steps for translating data and passing values from an external routine to a native routine.

Downloading is the process of passing values for the external parameters of the external routine to the memory allocated for the proxy routine interface parameters of the proxy routine. Downloading is performed after completion of the execution of the external routine. FIG. 7 is a flowchart showing the steps performed to translate data during downloading. The steps for translating data during downloading are similar in many respects to the steps performed for translating data during uploading. The foreign argument descriptor list is scanned for the base foreign argument descriptors, and then the subordinate foreign argument descriptors subordinate to a particular base foreign argument descriptor are scanned, in the manner described previously.

However, the steps differ in other respects, and shall be described in greater detail with respect to those differences. The steps in FIG. 7 shall be explained with reference to static descriptor list 510 (FIG. 5), foreign descriptor list 530, and offset table 580, which correspond to proxy routine interface 410, and external routine prototype 430, and parameters clause 420. The steps are performed in response to completing the execution of the external routine whose execution was commenced in step 614.

In FIG. 7, at step 704, the next foreign argument descriptor is read. The next foreign argument descriptor that is read is referred to as the current foreign argument descriptor. The native data type field and the native mode field are also read from the static argument descriptor linked to current foreign argument descriptor.

At step 710, a determination is made of whether a next foreign argument descriptor was read. If a foreign argument descriptor was not read, then control passes to step 714, where execution of the native routine which had invoked the proxy routine is resumed. Otherwise, control passes to step 720.

At step 720, a determination is made of whether the current foreign argument descriptor is a base foreign argument descriptor. The determination is made in a manner similar to that previously described in step 620. If the base attribute indicates that the current foreign argument descriptor is a base foreign argument descriptor, then control passes to step 724. Otherwise, control returns to step 704, where the next foreign argument descriptor is read.

At step 724, it is determined whether there are any subordinate foreign argument descriptors linked to the current (base) foreign argument descriptor. This determination is made in the manner previously described in step 624. If there are any subordinate foreign argument descriptors linked to the current (base) foreign argument descriptor, control then passes to step 730. Otherwise, control passes to step 740. At step 730, the first record of the offset sequence is read. The offset record which is read at step 730 is referred to as the current offset record.

At step 732, retrieve data for the current external parameter from the external routine. Data associated with the current external parameter is read from memory allocated for returning the data for the current external parameter. The data is read using techniques that are well known to those skilled in the art, and which depend on the operating system(s) running on computer system 100, and the calling standard.

At step 734, data is passed for the current attribute of the proxy routine interface parameter to memory allocated for the attribute. First, the current attribute and external data type of the current external parameter are determined, in a manner similar to that previously described. Next, data from the external parameter is written to the memory location storing the data structure in which the current attribute is contained. If differences in the data types of the external data type and the current attribute require, the data retrieved in step 734 is converted to a data type suitable for the data structure holding the data for the current attribute.

At step 736, a determination is made of whether another offset record, belonging to the offset sequence associated with the current foreign argument descriptor, follows the current offset record. The determination is made in a manner similar to that described in step 636. If another offset record follows, then control flows to step 738. At step 738, another member offset record of the current offset sequence is read. Then control returns to step 732.

If on the other hand, the determination in step 736 is that no offset record follows, control flows to step 740. At step 740, a value is passed for the base attribute of the current proxy routine interface parameter from the external parameter mapped to the attribute. The steps performed at step 740 are similar to those performed in step 732 and step 734.

For purposes illustrating steps shown in FIG. 7, at step 732, the current foreign argument descriptor is foreign argument descriptor 570, the current proxy routine interface parameter is proxy routine interface parameter 414 (nat_y in FIG. 4A), and the current offset record is offset record 591. The current offset record is linked to foreign argument descriptor 560. At step 732, length data associated with the current external parameter, external parameter 437 (ext_y in FIG. 4A), is read. At step 732, the current attribute, as indicated by attribute type 596, is determined to be the length attribute of the proxy routine interface parameter 414 (nat_y in FIG. 4A). The external data type, as indicated by external type 563, is the C data type short * (pointer to a short integer). No conversion of data is required by differences in the data types. Then, in step 734, length data for external parameter 435 (ext_y length in FIG. 4A) is written to the location of memory for storing the current length attribute for the current proxy routine interface parameter, proxy routine interface parameter 414 (nat_y in FIG. 4A).

In one embodiment of the invention, step 732 may include a determination of the attribute type field of the current offset record. If a given attribute type belongs to a category of attributes, then the steps pertaining to reading the external parameter mapped to the attribute of the proxy routine interface parameter and writing to the memory allocated to the attribute are skipped. For such attributes of the proxy routine interface parameters, it is not desirable to permit modification by an external routine.

For example, it is assumed that the external parameter 435 is mapped to the maximum length attribute of proxy routine interface parameter 414 (nat_y in FIG. 4A). The maximum length represents the number of characters in proxy routine interface parameter 414 (nat_y), and it is undesirable to change the property represented by the maximum length attribute. At step 732, after determining that the current attribute represents the maximum length of a proxy routine interface parameter, control flows to step 738, thus bypassing the current offset record and moving on to the next.

In another embodiment of the invention, another step is added between step 720 and step 724. In this step, a determination is whether the current proxy routine interface parameter is associated with the IN mode for passing parameters. If the current proxy routine interface parameter is associated with the IN mode, then control passes to step 704, where the next foreign attribute descriptor is read. When control flows to step 704 in this manner, data is not returned for the current interface parameter. As mentioned previously, memory associated with a parameter passed in under the IN mode is not read.

The present invention offers various advantages over previous approaches to making calls to external routines written in languages that do not support all of the data types of the calling language. First, once the proxy routine is defined by issuing an interface specification statement, the translation of data for passing values between a native routine and an external routine occurs without the need for any additional programming by the programmer. Thus a programmer is relieved of tedium and error-proneness associated with the "hard-coded" approach, where the programmer must manually provide code for translating data.

In addition, the translation of data is being performed by the code executor. Typically, the code executor is compiled into machine code for execution. Consequently, the execution of code that performs the translation of data is performed more efficiently than the interpretation of the additional programmer-supplied code required by the "hard-coded" approach. Finally, values for programmer-inaccessible attributes of data types in the native language may be passed to an external routine.

The present invention has been illustrated by reference to native routines written in PL/SQL™, and external routines written in C. However, the present invention as described herein is applicable to native routines and external routines written in other languages. Therefore, it is understood that the present invention is not limited to routines that are written in either PL/SQL™ or C.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for communicating with a called routine written in a first programming language that is not supported by a database system from a calling routine written in a second programming language that is supported by a database system, the method comprising the steps of:
   receiving within said database system user input that specifies an interface of a proxy routine in said second programming language for accessing said called routine, wherein said interface includes a first number of interface parameters and said called routine includes a second number of routine parameters, wherein each interface parameter of said interface parameters is of a data type supported by the second programming language, wherein said first number does not equal said second number;
   said database system generating metadata that establishes a mapping of the interface parameters of said interface to the routine parameters of said called routine; and
   wherein the step of receiving user input includes receiving user input that specifies that:
      a first attribute of a particular interface parameter of the interface is mapped to a first routine parameter; and
      a second attribute of the particular interface parameter is mapped to a second routine parameter.

2. The method of claim 1, wherein the step of generating metadata includes generating a list that contains foreign argument descriptors, each foreign argument
   descriptor being mapped to:
   an attribute of one interface parameter of the interface, and
   one routine parameter of the called routine.

3. A method for communicating with a called routine written in a first programming language that is not supported by a database system from a calling routine written in a second programming language that is supported by a database system, the method comprising the steps of:
   receiving within said database system user input that specifies an interface of a proxy routine in said second programming language for accessing said called routine, wherein said interface includes a first number of interface parameters and said called routine includes a second number of routine parameters, wherein each interface parameter of said interface parameters is of a data type supported by the second programming language, wherein said first number does not equal said second number;
   said database system generating metadata that establishes a mapping of the interface parameters of said interface to the routine parameters of said called routine; and wherein the step of receiving user input includes receiving user input specifying said mapping via an ordered list of attribute identifiers, wherein:

each attribute identifier:

identifies an attribute of an interface parameter, and is mapped to a routine parameter, and the position of each attribute identifier in the ordered list indicates the routine parameter to which the attribute identifier is mapped.

4. In a computer system, a method of determining a mapping between attributes of one or more interface parameters of a proxy routine written in a programming language that is supported by a database system, and one or more routine parameters of a called routine written in a programming language that is not supported by a database system, the method including the steps of:

said database system reading from within said database system a particular descriptor from a list of descriptors, wherein each descriptor from the list of descriptors is associated with:

an attribute of an interface parameter of the proxy routine, and a routine parameter of the called routine that corresponds to said attribute of the interface parameter;

said database system determining whether said particular descriptor corresponds to a base attribute for a particular interface parameter; and if said particular descriptor corresponds to a base attribute for a particular interface parameter, then said database system following links from said particular descriptor to identify subordinate descriptors, wherein said subordinate descriptors are associated with:

other attributes of the particular interface parameter, and routine parameters of the called routine corresponding to said other attributes.

5. The method of claim 4, wherein the step of following links includes:

reading a particular link to a sequence of one or more records, each record of said sequence being associated with one of said subordinate descriptors; and reading each record of said sequence to identify said subordinate descriptors.

6. A computer-readable medium carrying one or more sequences of one or more instructions for communicating with a called routine written in a first programming language that is not supported by a database system from a calling routine written in a second programming language that is supported by a database system, wherein the execution of the one or more sequences of the one or more instructions causes the one or more processors to perform the steps of:

receiving within said database system user input that specifies an interface of a proxy routine in said second programming language for accessing said called routine, wherein said interface includes a first number of interface parameters and said called routine includes a second number of routine parameters, wherein each interface parameter of said interface parameters is of a data type supported by the second programming language, wherein said first number does not equal said second number;

said database system generating metadata that establishes a mapping of the interface parameters of said interface to the routine parameters of said called routine; and wherein the step of receiving user input includes receiving user input that specifies that:

a first attribute of a particular interface parameter of the interface is mapped to a first routine parameter; and a second attribute of the particular interface parameter is mapped to a second routine parameter.

7. The computer readable medium of claim 6, wherein the step of generating metadata includes generating a list that contains foreign argument descriptors, each foreign argument descriptor being mapped to:

an attribute of one interface parameter of the interface, and one routine parameter of the called routine.

8. A computer-readable medium carrying one or more sequences of one or more instructions for communicating with a called routine written in a first programming language that is not supported by a database system from a calling routine written in a second programming language that is supported by a database system, wherein the execution of the one or more sequences of the one or more instructions causes the one or more processors to perform the steps of:

receiving within said database system user input that specifies an interface of a proxy routine in said second programming language for accessing said called routine, wherein said interface includes a first number of interface parameters and said called routine includes a second number of routine parameters, wherein each interface parameter of said interface parameters is of a data type supported by the second programming language, wherein said first number does not equal said second number; and said database system generating metadata that establishes a mapping of the interface parameters of said interface to the routine parameters of said called routine; and wherein the step of receiving user input includes receiving user input specifying said mapping via an ordered list of attribute identifiers, wherein:

each attribute identifier:

identifies an attribute of an interface parameter, and is mapped to a routine parameter, and the position of each attribute identifier in the ordered list indicates the routine parameter to which the attribute identifier is mapped.

9. A computer-readable medium carrying one or more sequences of one or more instructions for a method of determining a mapping between attributes of one or more interface parameters of a proxy routine written in a programming language that is supported by a database system, and one or more routine parameters of a called routine written in a programming language that is not supported by a database system, wherein the execution of the one or more sequences of the one or more instructions causes the one or more processors to perform the steps of:

reading a particular descriptor from a list of descriptors, wherein each descriptor from the list of descriptors is associated with:

an attribute of an interface parameter of the proxy routine, and a routine parameter of the called routine that corresponds to said attribute of the interface parameter;

determining whether said particular descriptor corresponds to a base attribute for a particular interface parameter; and if said particular descriptor corresponds to a base attribute for a particular interface parameter, then following links from said particular descriptor to identify subordinate descriptors, wherein said subordinate descriptors are associated with:
  other attributes of the particular interface parameter, and
  routine parameters of the called routine corresponding to said other attributes.

10. The computer readable medium of claim 9, wherein the step of following links includes:
  reading a particular link to a sequence of one or 6 more records, each record of said sequence being associated with one of said subordinate descriptors; and
  reading each record of said sequence to identify said subordinate descriptors.

* * * * *

UNITED STATES PATENT AND TRADEMARK OFFICE
CERTIFICATE OF CORRECTION

PATENT NO. : 6,931,642 B1
DATED : August 16, 2005
INVENTOR(S) : Hari et al.

It is certified that error appears in the above-identified patent and that said Letters Patent is hereby corrected as shown below:

Column 22,
Line 31, "second number; and" should be -- second number --.

Signed and Sealed this

Fourth Day of October, 2005

JON W. DUDAS
*Director of the United States Patent and Trademark Office*